(12) United States Patent
Emmanuel et al.

(10) Patent No.: US 10,197,166 B2
(45) Date of Patent: Feb. 5, 2019

(54) VACUUM GATE VALVE

(71) Applicant: SUMITOMO HEAVY INDUSTRIES, LTD., Tokyo (JP)

(72) Inventors: Vyers Emmanuel, Funabashi (JP); Mie Kimura, Funabashi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 15 days.

(21) Appl. No.: 15/375,201

(22) Filed: Dec. 12, 2016

(65) Prior Publication Data
US 2018/0163876 A1 Jun. 14, 2018

(51) Int. Cl.
*F16K 3/10* (2006.01)
*F16K 3/20* (2006.01)
*F16K 51/02* (2006.01)

(52) U.S. Cl.
CPC ............ *F16K 3/10* (2013.01); *F16K 3/20* (2013.01); *F16K 51/02* (2013.01)

(58) Field of Classification Search
CPC ..... F16K 3/10; F16K 3/04; F16K 3/20; F16K 51/20
USPC ....... 251/159, 170, 171, 174, 176, 177, 193, 251/197, 301
See application file for complete search history.

(56) References Cited

U.S. PATENT DOCUMENTS

| | | | | |
|---|---|---|---|---|
| 3,047,006 A * | 7/1962 | Transeau | ............. | B65D 90/587 137/243 |
| 3,145,969 A * | 8/1964 | Von Zweck | ............ | F16K 3/207 251/172 |
| 3,576,198 A * | 4/1971 | Bessot | ..................... | F16K 3/188 137/375 |
| 3,998,425 A * | 12/1976 | Braucksiek | ............... | H01F 7/06 251/129.16 |
| 4,215,722 A * | 8/1980 | Sigmon | ................... | F16K 5/207 137/625.3 |
| 4,278,236 A * | 7/1981 | Janich | ..................... | F16K 3/207 251/159 |
| 4,513,947 A * | 4/1985 | Amend | ..................... | F16K 3/20 251/159 |
| 4,562,992 A * | 1/1986 | Sugisaki | ................. | F16K 3/207 251/159 |
| 5,032,812 A * | 7/1991 | Banick | .................. | F16K 31/082 335/17 |
| 5,101,853 A * | 4/1992 | Mailliet | ................. | B65G 53/46 137/242 |

(Continued)

FOREIGN PATENT DOCUMENTS

| | | | | |
|---|---|---|---|---|
| JP | WO 2008023499 A1 * | 2/2008 | ............... | F16K 3/20 |
| JP | 2011-117488 A | 6/2011 | | |
| JP | 2015-224751 A * | 12/2015 | | |

*Primary Examiner* — Reinaldo Sanchez-Medina
*Assistant Examiner* — David Colon Morales
(74) *Attorney, Agent, or Firm* — HEA Law PLLC

(57) ABSTRACT

A vacuum gate valve includes a casing having an opening, and a valve plate that swings in the casing to open/close the opening. The vacuum gate valve further includes a position adjuster for bringing the valve plate into close contact with the casing when the valve plate is in a position where it entirely closes the casing opening. The position adjuster includes a rise/lower element for moving up and down inside the casing to come into contact with the valve plate and adjust the valve plate's position, and a raising/lowering unit for raising/lowering the rise/lower element inside the casing without friction resistance being generated between the rise/lower element and the casing.

12 Claims, 6 Drawing Sheets

(56) References Cited

U.S. PATENT DOCUMENTS

| | | | | |
|---|---|---|---|---|
| 5,197,508 A * | 3/1993 | Gottling | ................... | F16K 11/04 |
| | | | | 137/1 |
| 5,577,707 A * | 11/1996 | Brida | ........................ | F16K 3/20 |
| | | | | 251/159 |
| 5,578,763 A * | 11/1996 | Spencer | ..................... | G01F 1/22 |
| | | | | 73/861.08 |
| 5,927,684 A * | 7/1999 | Marx | ........................ | F16K 3/20 |
| | | | | 251/195 |
| 6,260,490 B1 * | 7/2001 | Wark | ........................ | F16K 3/10 |
| | | | | 110/101 R |
| 6,321,781 B1 * | 11/2001 | Kurth | ................... | F16K 31/0655 |
| | | | | 137/554 |
| 6,340,029 B1 * | 1/2002 | Jun | ........................ | F16K 1/228 |
| | | | | 137/1 |
| 6,633,157 B1 * | 10/2003 | Yamaki | ..................... | F01L 9/04 |
| | | | | 123/90.11 |
| 6,693,787 B2 * | 2/2004 | Kolmanovsky | ............ | F01L 9/04 |
| | | | | 361/154 |
| 6,729,277 B2 * | 5/2004 | Yamaki | ..................... | F01L 9/04 |
| | | | | 123/90.11 |
| 6,776,394 B2 * | 8/2004 | Lucas | ..................... | F16K 51/02 |
| | | | | 251/203 |
| 6,863,256 B2 * | 3/2005 | Lucas | ....................... | F16K 3/06 |
| | | | | 251/159 |
| 6,994,317 B2 * | 2/2006 | Fischer | ................... | F16K 3/029 |
| | | | | 251/193 |
| 7,969,146 B2 * | 6/2011 | Christianson | ........ | F16K 37/0033 |
| | | | | 324/207.2 |
| 8,123,195 B2 * | 2/2012 | Iwabuchi | ............... | F16K 1/2266 |
| | | | | 251/161 |
| 8,448,917 B2 * | 5/2013 | Nagai | ....................... | F16K 3/06 |
| | | | | 251/193 |
| 2016/0040788 A1 * | 2/2016 | Taguchi | ................ | F16K 3/0227 |
| | | | | 251/301 |

* cited by examiner

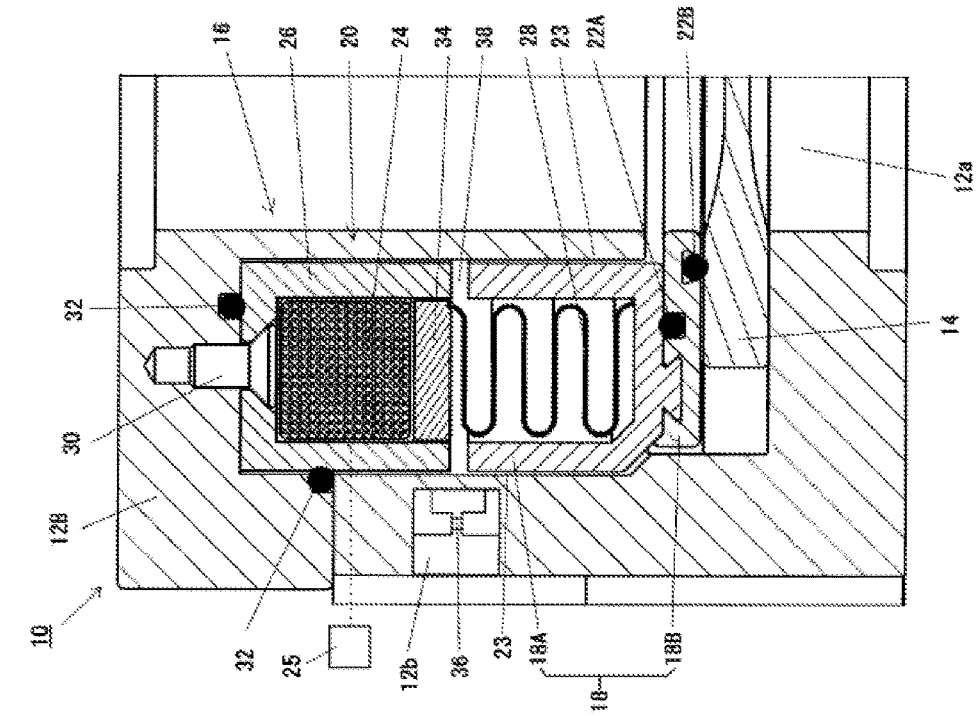
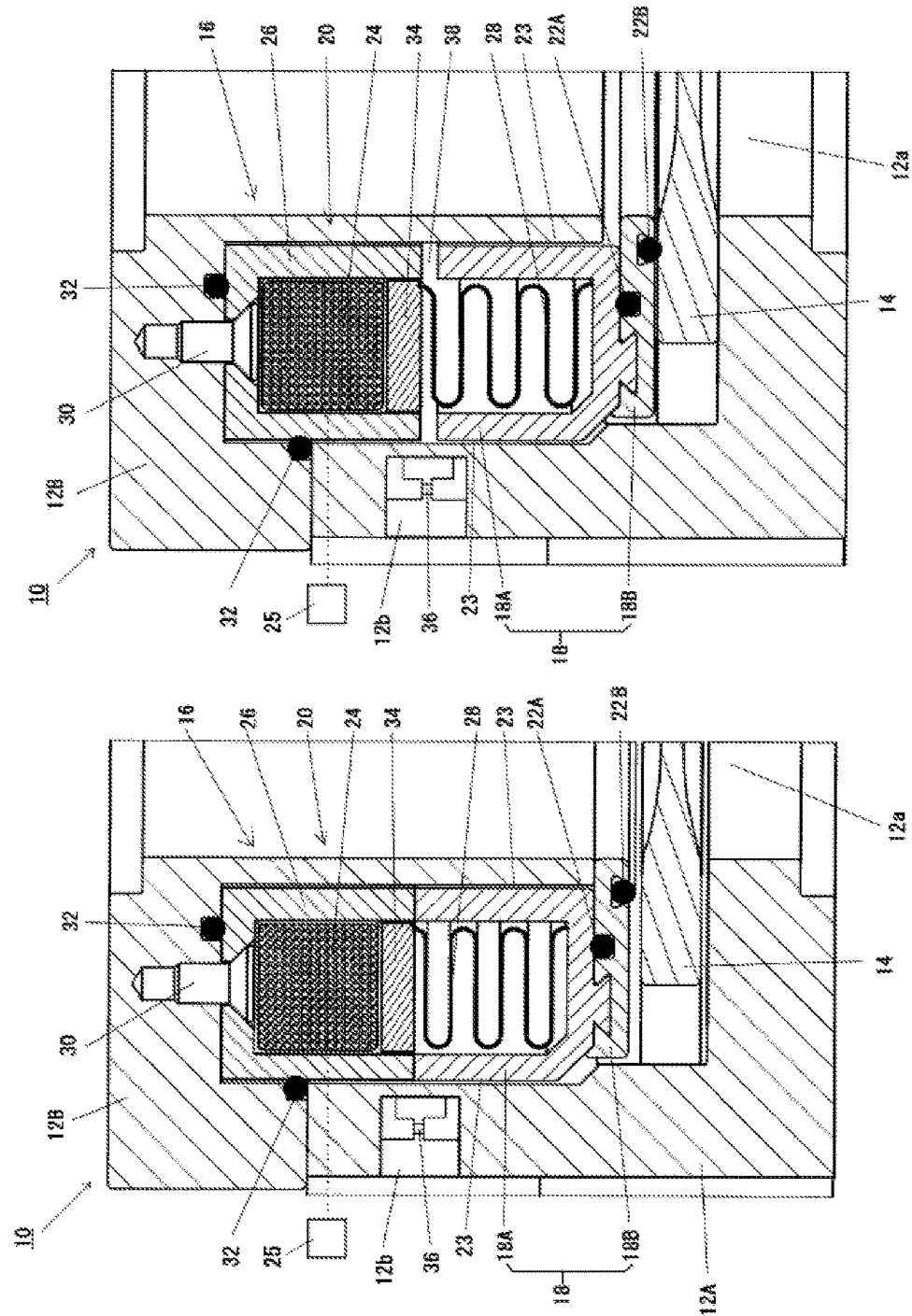

VACUUM GATE VALVE

INCORPORATION BY REFERENCE

The disclosure of Japanese Patent Application No. 2014-111161 is incorporated herein by reference in its entirety.

BACKGROUND OF THE INVENTION

1. Field of the Invention

The present invention relates to a vacuum gate valve.

2. Description of the Related Art

In operations for manufacturing semiconductor devices, in order to pump down, into a vacuum state, the interior of the various processing chambers for carrying out thin-film processes by means of etching devices and chemical vapor deposition (CVD) and for carrying out PVD and like processes, gate valves are employed between the processing chambers and vacuum pumps.

SUMMARY OF THE INVENTION

One aspect of the present invention affords a vacuum gate valve furnished with a casing having an opening, and a valve plate that swings in the casing to open/close the opening, with the vacuum gate valve including a position adjuster for bringing the valve plate into close contact with the casing when the valve plate is in a position where it entirely closes the casing opening, wherein the position adjuster includes a rise/lower element for moving up and down inside the casing to come into contact with the valve plate and adjust the valve plate's position, and a raising/lowering unit for raising/lowering the rise/lower element inside the casing without friction resistance being generated between the rise/lower element and the casing.

BRIEF DESCRIPTION OF THE DRAWINGS

FIGS. 2A and 2B are cross-sectional views of the vacuum gate valve according to the embodiment of the present invention;

DETAILED DESCRIPTION OF THE INVENTION

Figure 1:
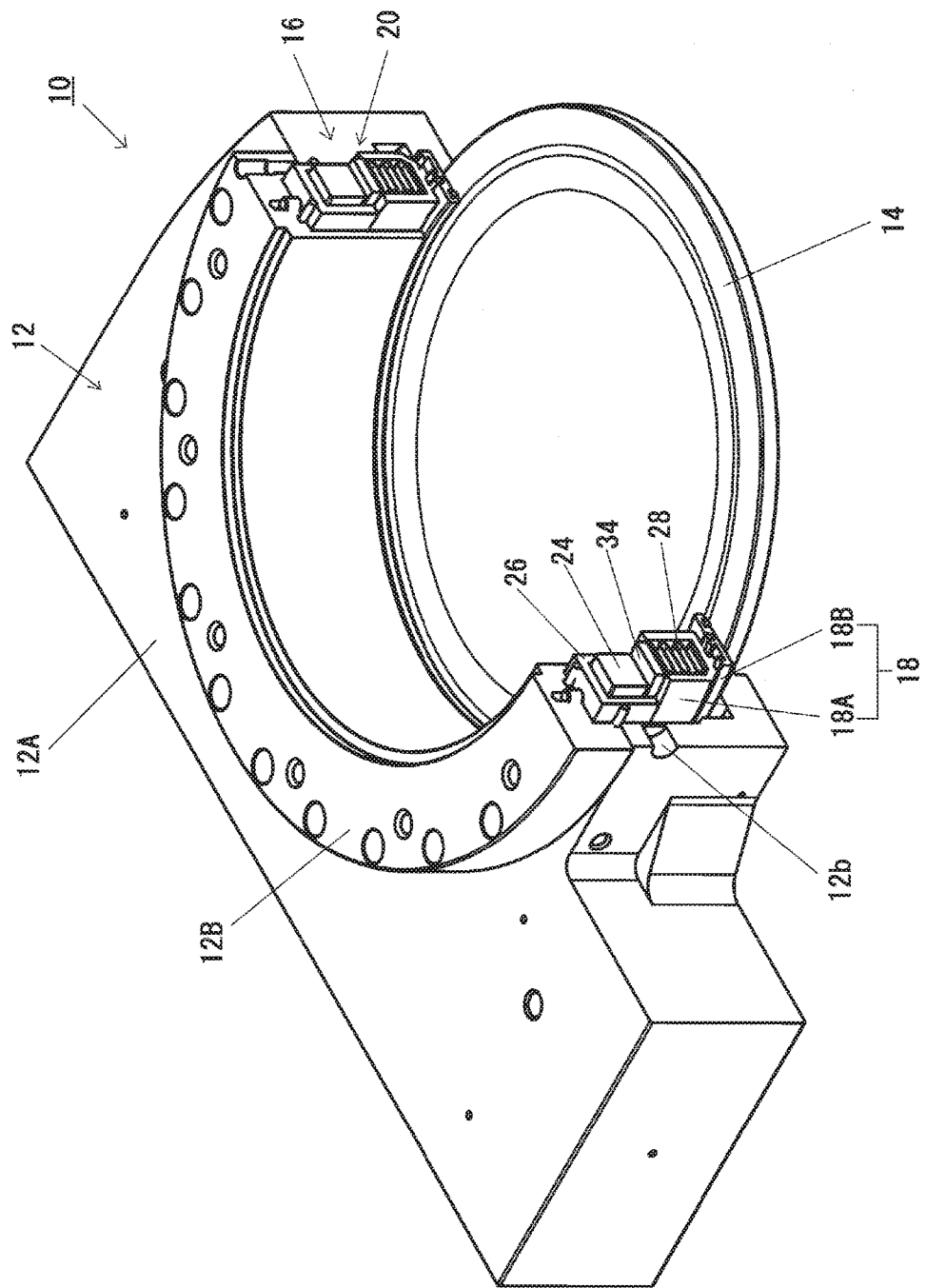
FIG. 1 is a partially broken perspective view of a vacuum gate valve according to an embodiment of the present invention.

The invention will now be described by reference to the preferred embodiments. This does not intend to limit the scope of the present invention, but to exemplify the invention.

Embodiments of the present invention relate to improvement of a vacuum gate valve for being used for a processing chamber for a semiconductor device and for evacuating each of various processing chambers and more specifically relate to reliably keeping a sealed state by means of a valve plate, restricting generation of particles due to contact between metals, being excellent in durability, and facilitating maintenance.

In a process for manufacturing a semiconductor device, to set in a vacuum state an inside of each of various processing chambers for performing thin-film processing by means of an etching unit and CVD (chemical vapor deposition) and performing processing such as PVD, a gate valve is used between the processing chamber and a suction pump. In recent years, as this vacuum gate valve, a horizontal rotary gate valve in which the valve plate swings in a horizontal direction inside a casing is often employed due to advantages in terms of space and relative ease of production.

In this horizontal rotary vacuum gate valve, to secure smooth swing of the valve plate in the casing, a slight gap is set between the valve plate and the casing. Accordingly, to fill the gap and secure a sealed state after the valve plate is moved to a position for closing an opening, the valve plate needs to be brought into close contact with the casing.

In this case, to prevent displacement and deformation of the valve plate due to a pressure difference, reliably keep the sealed state, and restrict damage of the valve plate, the present inventors proposed a vacuum gate valve further including a position adjuster that brings a valve plate into close contact with a casing when the valve plate is located at a position for entirely closing an opening, wherein this position adjuster includes a driving source, a rotating body that is rotated by the driving source, and a rise/lower element that moves up and down relatively to the rotating body in response to rotation of the rotating body, and wherein this rise/lower element contacts the valve plate to adjust a position of the valve plate. While this technique does not mechanically allow displacement of the valve plate with no elastic member interposed between the valve plate and the casing at the time of close contact of the valve plate with the casing, the technique allows swing of the valve plate to enable opening/closing except at the time of close contact of the valve plate with the casing.

However, in this vacuum gate valve, the rise/lower element is housed in the casing to closely contact the casing via an O-ring and grease and slides inside the casing. In this case, the O-ring is worn relatively early due to abrasion. Also, since the vacuum gate valve is heated at 80° C. to 120° C. by baking at the time of operation, components of the grease are volatilized to cause particles. Also, when rising/lowering of the rise/lower element is repeated in a state in which the grease does not spread sufficiently, contact among metals serving as materials for the rise/lower element, the valve plate, and the casing (metal contact) may also cause particles. When the particles caused by the O-ring, the grease, and the metal materials scatter inside the processing chamber, the particles may influence performance of the semiconductor device to be manufactured and damage various measuring instruments such as a pressure sensor, which may cause failures.

Thus, in the conventional vacuum gate valve, relatively short-cycle maintenance such as refilling of the grease and replacement of the O-ring is required. Also, at the same time as contact between the rise/lower element and the casing must reliably be avoided to prevent generation of particles, easy access and attachment/detachment for maintenance are quite important since short-cycle maintenance is required in some cases because these mechanical parts are used under an extremely strict environment.

Also, a case in which this rise/lower element is moved up and down by a magnet serving as a driving source is conceivable. However, in this case, to control rising/lowering in accordance with a magnetic force of the magnet, the intensity of the magnetic force (magnetic flux density) needs to be detected. To detect the magnetic flux density, arranging a sensor in a member magnetized by the magnet is generally conceived. However, as described above, since the members used in the vacuum gate valve are heated up to 100° C. or so, heat resistance of the sensor needs to be considered. Also, in a case in which the sensor is installed in the member arranged in the casing, this causes a problem in which maintenance and replacement of the sensor are troublesome. On the other hand, a case in which the sensor is installed in a gap part between the magnet and the rise/lower element to measure gap magnetic flux density is conceivable. However, it is difficult to install the sensor in the gap part since the gap part is a part in which collision occurs at the time of attachment of the magnet. Further, since the gap part is a part located on the vacuum side in a case in which the vacuum gate valve is attached to the processing chamber, countermeasures against flow of atmospheric air is required, and a problem of difficulty in securing normal operation of the sensor under vacuum occurs.

In consideration of the above problems, an object to be achieved by embodiments of the present invention is to provide a vacuum gate valve that can reliably keep a sealed state brought by a valve plate, can restrict generation of particles due to grease and contact between metals, has high durability, and can provide easy maintenance.

According to an aspect of the present invention, there is provided a vacuum gate valve including a casing that has an opening and a valve plate that swings in the casing to open/close the opening, and the vacuum gate valve further includes a position adjuster that brings the valve plate into close contact with the casing when the valve plate is located at a position for entirely closing the opening, wherein the position adjuster includes a rise/lower element that moves up and down inside the casing and contacts the valve plate to adjust a position of the valve plate and an raising/lowering unit that moves the rise/lower element up and down inside the casing to prevent friction resistance from being generated between the rise/lower element and the casing.

The rise/lower element may be installed in the casing with no O-ring or grease provided between the rise/lower element and the casing, and the raising/lowering unit may move the rise/lower element up and down to prevent the rise/lower element from contacting the casing.

The raising/lowering unit may include an electromagnet that generates a magnetic force through electric conduction to attract the rise/lower element and control the electric conduction to adjust the magnetic force generated by the electromagnet and move the rise/lower element up and down.

The raising/lowering unit may include a sensor that detects magnetic flux density generated by the electromagnet. By controlling electric conduction to the electromagnet in accordance with the magnetic flux density detected by the sensor and adjusting the magnetic force, the vacuum gate valve may control rising/lowering speed of the rise/lower element.

The electromagnet may be installed inside an adsorbing body that is installed in the casing, is magnetized by the electromagnet, and adsorbs the rise/lower element, and the sensor may be installed in a position that is away from the adsorbing body and the rise/lower element magnetized by the electromagnet and a gap between the adsorbing body and the rise/lower element and detect the magnetic flux density generated by the electromagnet.

The sensor may be installed beside the gap between the adsorbing body and the rise/lower element.

The raising/lowering unit may determine that the magnetic force of the electromagnet is stronger as the magnetic flux density detected by the sensor is lower, determine that the magnetic force of the electromagnet is weaker as the magnetic flux density detected by the sensor is higher, and set rising/lowering speed of the rise/lower element to a predetermined value in accordance with the magnetic force.

The sensor may be installed inside the casing to enable the sensor to be attached/detached from an outside of the casing.

The raising/lowering unit may include bellows that are in a non-contact state with the casing, and the bellows may guide rising/lowering of the rise/lower element in the rise/lower element's rising/lowering.

The bellows may have spring characteristics and bias the rise/lower element in a direction of pressing the rise/lower element against the valve plate in a normal state, and the electromagnet may move up the rise/lower element against the pressing force of the bellows.

A first end of the bellows may be connected to a side of the casing while a second end thereof may be connected to the rise/lower element to block flowing of atmospheric air into a rear side of the valve plate.

The bellows may be made of a non-magnetic material such as stainless steel.

According to an embodiment of the present invention, as described above, since the position adjuster includes the rise/lower element that moves up and down inside the casing and contacts the valve plate to adjust the position of the valve plate and the raising/lowering unit that moves the rise/lower element up and down inside the casing to prevent friction resistance from being generated between the rise/lower element and the casing, direct metal contact between the rise/lower element and the casing can be avoided. Thus, the present invention is advantageous in that the vacuum gate valve that can effectively restrict generation of particles and damage of the rise/lower element and the casing and that is excellent in durability can be obtained.

In this case, especially according to the embodiment of the present invention, as described above, since the rise/lower element may be installed in the casing with no O-ring or grease provided between the rise/lower element and the casing, and the raising/lowering unit may move the rise/lower element up and down to prevent the rise/lower element from contacting the casing, the present invention is advantageous in that abrasion of the O-ring and generation of particles due to volatilization of the grease can be avoided, maintenance operations such as replacement of the O-ring and refilling of the grease can be dispensed with, and the rise/lower element can be used in a stable manner for a long period and can provide easy maintenance.

According to the embodiment of the present invention, as described above, since the magnetic force generated by the electromagnet is adjusted to move the rise/lower element up and down, the rise/lower element can be move up and down without the need for mechanically holding the rise/lower element in the casing. Also, in this case, since, by controlling electric conduction to the electromagnet in accordance with the magnetic flux density detected by the sensor that detects the magnetic flux density generated by the electromagnet and adjusting the magnetic force, the vacuum gate valve controls rising/lowering speed of the rise/lower element, the present invention is advantageous in that collision or the like of the rise/lower element with the adsorbing body and the valve plate caused by unnecessary sudden upward or downward movement of the rise/lower element can appropriately be restricted, and generation of particles due to metal contact can be restricted.

According to the embodiment of the present invention, as described above, since the sensor that detects the magnetic flux density is installed in the position that is away from the adsorbing body and the rise/lower element magnetized by the electromagnet and the gap between the adsorbing body and the rise/lower element, such as a position beside the gap between the adsorbing body and the rise/lower element, the present invention is advantageous in that the magnetic flux density can be detected appropriately without being influenced by heat and vacuum and without being impacted at the time of collision between the adsorbing body and the rise/lower element, and rising/lowering speed of the rise/lower element can be controlled accurately.

In this case, the magnetic flux density in the position that is away from the gap between the adsorbing body and the rise/lower element is inversely proportional to the magnetic flux density in the gap. That is, in a case in which the gap (distance) between the adsorbing body and the rise/lower element is large, and in which the magnetic flux density is low (the magnetic force is weak), the magnetic flux density in the position that is away from the gap is high, and conversely, in a case in which the gap is filled, and in which the rise/lower element closely contacts the adsorbing body, the magnetic flux density in the position that is away from the gap is low. Based on this, the magnetic force of the electromagnet is determined to be stronger as the magnetic flux density detected by the sensor is lower, the magnetic force of the electromagnet is determined to be weaker as the magnetic flux density detected by the sensor is higher. Accordingly, the present invention is advantageous in that, even when the sensor is installed in the position away from the adsorbing body and the gap, the rising/lowering speed of the rise/lower element can appropriately be set to a predetermined value in accordance with the magnetic force.

Also, according to the embodiment of the present invention, as described above, since the sensor may be installed inside the casing to enable the sensor to be attached/detached from the outside of the casing, the present invention is advantageous in that, even in a case in which maintenance, such as an inspection and cleaning, and replacement, of the sensor are required, one can easily access the sensor and can easily perform the operations.

Further, according to the embodiment of the present invention, as described above, since the raising/lowering unit guides rising/lowering of the rise/lower element by means of the bellows (bellows-like spring) that are in a non-contact state with the casing, the present invention is advantageous in that, the rise/lower element can be moved up and down in an appropriate orbit even when the rise/lower element is moved up and down by the electromagnet without contacting the casing.

According to the embodiment of the present invention, as described above, since the bellows may have spring characteristics, the present invention is advantageous in that the bellows can absorb an impact generated at the time of contact of the rise/lower element with the adsorbing body or the valve plate and restrict generation of particles due to metal contact.

In addition, according to the embodiment of the present invention, as described above, since the first end of the bellows is connected to the side of the casing while the second end thereof is connected to the rise/lower element, flowing of atmospheric air into the rear side of the valve plate (a processing chamber side, which needs to be in a vacuum state) can be blocked. The present invention is advantageous in that, while the rise/lower element is in a non-contact state with the casing without using an O-ring or the like, that is, while a space exists between the rise/lower element and the casing, the sealed state on the processing chamber side can be secured.

In this case, according to the embodiment of the present invention, as described above, since the bellows are made of the non-magnetic material such as stainless steel, the present invention is advantageous in that the bellows can expand and contract together with upward and downward movement of the rise/lower element independently from the magnetic force generated by the electromagnet and can appropriately exert guiding of the rise/lower element and a buffer effect.

Embodiments of the present invention will be described in detail with reference to the drawings. FIGS. 1, 2A, and 2B illustrate a vacuum gate valve 10 according to an embodiment. This vacuum gate valve 10 is installed between a processing chamber to be used in a process for manufacturing a not-illustrated semiconductor device and a not-illustrated suction pump for evacuating an inside of the processing chamber and is used to seal and keep the processing chamber in a vacuum state, for example.

As illustrated in FIGS. 1, 2A, and 2B, the vacuum gate valve 10 according to the embodiment includes a casing 12 that has an opening 12a, a valve plate 14 that swings in this casing 12 to open/close the opening 12a, a not-illustrated motor that drives this valve plate 14, and a position adjuster 16 that brings the valve plate 14 into close contact with the casing 12 when the valve plate 14 is located at a position for entirely closing the opening 12a to keep the processing chamber in a vacuum state. The casing 12 is made of a non-magnetic material such as aluminum.

In the embodiment, as illustrated in FIGS. 1, 2A, and 2B, this position adjuster 16 includes a rise/lower element 18 that moves up and down inside the casing 12 and contacts the valve plate 14 to adjust a position of the valve plate 14 and an raising/lowering unit 20 that moves the rise/lower element 18 up and down inside the casing 12 to prevent friction resistance from being generated between the rise/lower element 18 and the casing 12. Thus, since direct metal contact between the rise/lower element 18 and the casing 12 can be avoided, the vacuum gate valve 10 that can effectively restrict generation of particles and damage of the rise/lower element 18 and the casing 12 and that is excellent in durability can be obtained.

As illustrated in FIGS. 1, 2A, and 2B, the rise/lower element 18 and the raising/lowering unit 20 are arranged at a circumference of the opening 12a of the casing 12 and are housed inside the casing 12. Accordingly, as illustrated in FIGS. 2A and 2B, space saving and keeping of a sealed state can be achieved without a great change of conventional design in terms of the size and the shape of the casing 12.

Also, especially as illustrated in FIG. 1, the casing 12 includes a casing main body 12A and a cover 12B that is detachably attached to the casing main body 12A by means of bolts or the like. Thus, the casing 12 is formed to be openable by attaching/detaching the cover 12B. As illustrated in FIG. 1, the rise/lower element 18 and the raising/lowering unit 20 are detachably housed inside the casing 12 by this openable casing 12. Thus, maintenance, such as an inspection and a repair, and replacement, of the rise/lower element 18 and the raising/lowering unit 20, can be performed easily.

1. Rise/Lower Element

The rise/lower element 18 is formed in a ring shape along the circumference of the opening 12a of the casing 12 as illustrated in FIG. 1 and contacts the valve plate 14 annularly along an outline of the circular-plate-like valve plate 14 around an outer circumference of the valve plate 14, that is, over the entire circumference of the valve plate 14, to enable the valve plate 14 to closely contact the casing 12 as illustrated in FIGS. 2A and 2B. Warping of the valve plate 14 only in one direction such as a tip end direction to cause a gap between the valve plate 14 and the casing 12 is prevented, and the sealed state can reliably be kept.

Also, as illustrated in FIGS. 1, 2A, and 2B, the rise/lower element 18 includes a tubbish rise/lower element main body 18A that has a recessed vertical cross-section and a pressing member 18B that is connected to a lower side of the rise/lower element main body 18A and presses down the valve plate 14. In this case, as illustrated in FIGS. 2A and 2B, while the pressing member 18B is fitted in and connected to the rise/lower element main body 18A via a main-body-side O-ring 22A, the pressing member 18B is provided with a plate-side O-ring 22B on a surface thereof contacting the valve plate 14, to enable the pressing member 18B to be elastically engaged with the rise/lower element main body 18A and the valve plate 14.

Figure 5A:
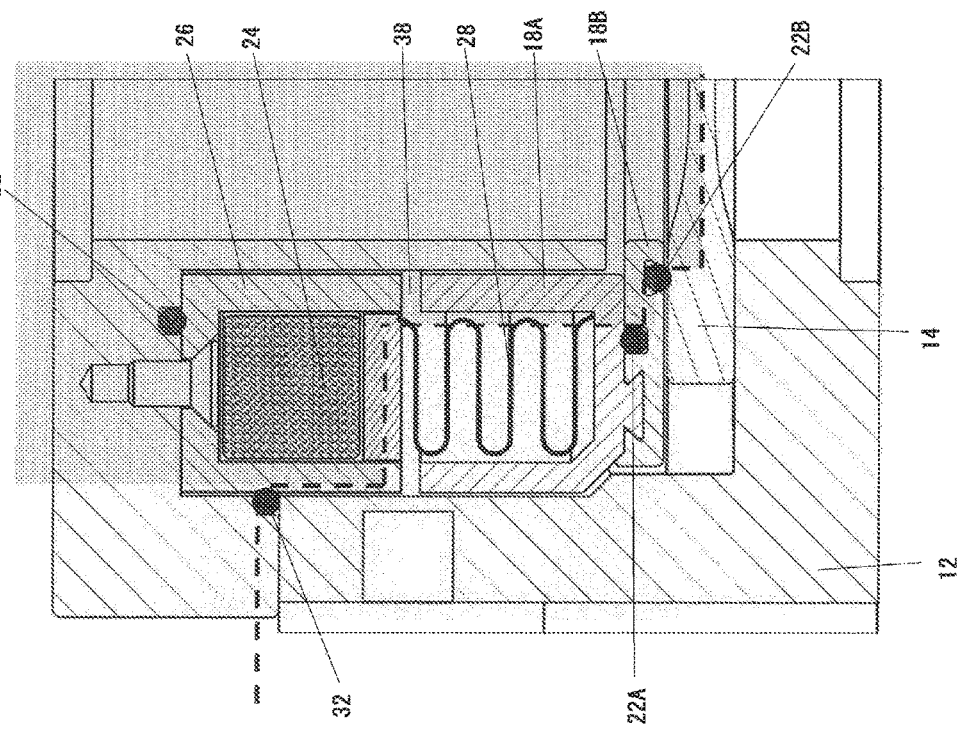
FIGS. 5A and 5B are cross-sectional views illustrating states in which bellows for use in the embodiment of the present invention block atmospheric air.
Figure 5B:
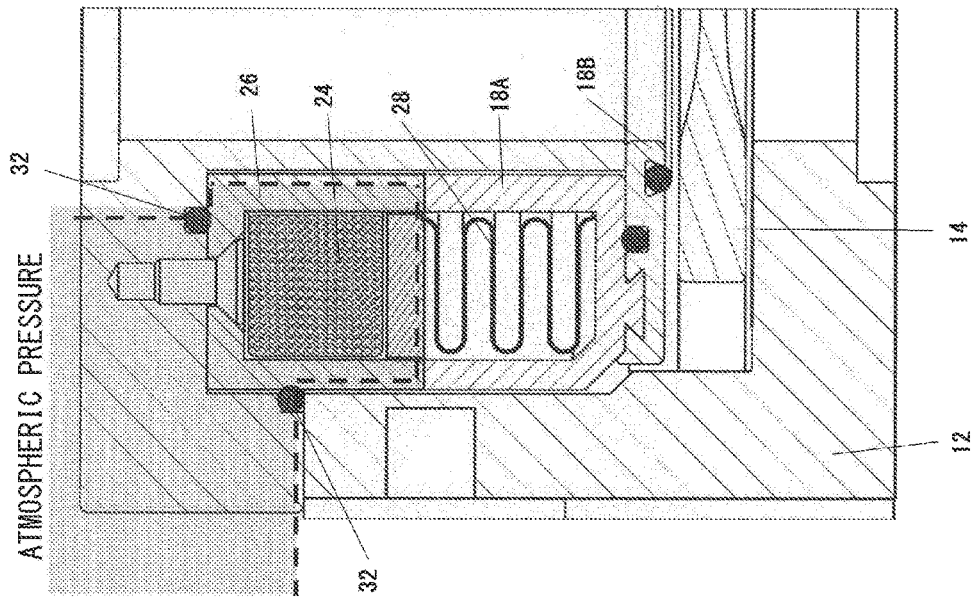

Thus, the pressing member 18B can absorb an impact at the time of contacting the valve plate 14 and absorb twist of the valve plate 14 caused by slight displacement of the valve plate 14 in the horizontal direction, and the twist will not be transmitted to the rise/lower element main body 18A. When the rise/lower element 18 closely contacts the valve plate 14 as illustrated in FIG. 2B, the plate-side O-ring functions to keep a space between the rise/lower element 18 and the valve plate 14 airtight and to keep a rear side of the valve plate 14 (a processing chamber side, which is an opposite side of the rise/lower element 18 with the valve plate 14 interposed therebetween) in a vacuum state as illustrated in FIG. 5B.

On the other hand, especially as illustrated in FIGS. 2A and 2B, the rise/lower element 18 including the rise/lower element main body 18A is installed in the casing 12 with a slight gap 23 between the rise/lower element 18 and the casing 12 with no O-ring or grease provided between the rise/lower element 18 and the casing 12. Accordingly, since the rise/lower element 18 moves up and down, keeping a state of the position illustrated in FIGS. 2A and 2B, the rise/lower element 18 can move up and down without contacting the casing 12. Consequently, abrasion of the O-ring and generation of particles due to volatilization of the grease can be avoided, maintenance operations such as replacement of the O-ring and refilling of the grease can be dispensed with, and the rise/lower element 18 can be used in a stable manner for a long period and can provide easy maintenance. Meanwhile, the rise/lower element 18 is made of a magnetic material, specifically, SUS403 or the like, which is ferromagnetic stainless steel, and is magnetized when a below-mentioned electromagnet 24 of the raising/lowering unit 20 generates a magnetic force through electric conduction.

2. Raising/Lowering Unit

As illustrated in FIGS. 1, 2A, and 2B, the raising/lowering unit 20 includes the electromagnet 24 that generates a magnetic force through electric conduction to attract the rise/lower element 18, an adsorbing body 26 that is installed in the casing 12, is magnetized by the electromagnet 24, and adsorbs the rise/lower element 18, and bellows 28 that are installed in the recess of the rise/lower element 18 and connect the adsorbing body 26 to the rise/lower element 18. Thus, it will be appreciated that the rise/lower element 18 functions as a rise/lower armature, while the raising/lowering unit 20 functions as an electromagnetic raising/lowering actuator.

2.-1 Adsorbing Body

As illustrated in FIGS. 1, 2A, and 2B, the adsorbing body 26 is formed in a ring shape along the circumference of the opening 12a of the casing 12 in a similar manner to the rise/lower element 18 and is provided to correspond to the entire circumference of the rise/lower element 18. As illustrated in FIGS. 1, 2A, and 2B, the adsorbing body 26 has a reversely-recessed vertical cross-section and is arranged in the casing 12 by fixing a top surface (a bottom surface of the recess) part of this reversely-recessed portion to the casing 12 by means of screws 30 at plural locations. In this case, especially as illustrated in FIGS. 2A and 2B, the adsorbing body 26 is installed in the casing 12 via two sealing O-rings 32. When the rise/lower element 18 is separated from the valve plate 14 as illustrated in FIG. 2A, the two sealing O-rings 32 function to keep a space between the casing 12 and the adsorbing body 26 airtight and to keep the rise/lower element 18 and the rear side of the valve plate 14 (the processing chamber side, which is an opposite side of the rise/lower element 18 with the valve plate 14 interposed therebetween) in a vacuum state as illustrated in FIG. 5A.

Also, similarly to the rise/lower element 18, the adsorbing body 26 is made of a magnetic material, specifically, SUS403 or the like, which is ferromagnetic stainless steel, and is magnetized when the electromagnet 24 generates a magnetic force through electric conduction.

2.-2 Electromagnet

As illustrated in FIGS. 1, 2A, and 2B, the electromagnet 24 is formed in a ring shape along the circumference of the opening 12a of the casing 12 and is provided to correspond to the entire circumference of the rise/lower element 18. Especially as illustrated in FIGS. 2A and 2B, the electromagnet 24 is housed in the reversely-recessed portion of the adsorbing body 26 and is installed inside the adsorbing body 26 by a lid 34 that closes an opening portion of the recessed portion of the adsorbing body 26. Meanwhile, this lid 34 is made of a non-magnetic material such as SUS304 not to be influenced by a magnetic field generated by the magnet.

Figure 3A:
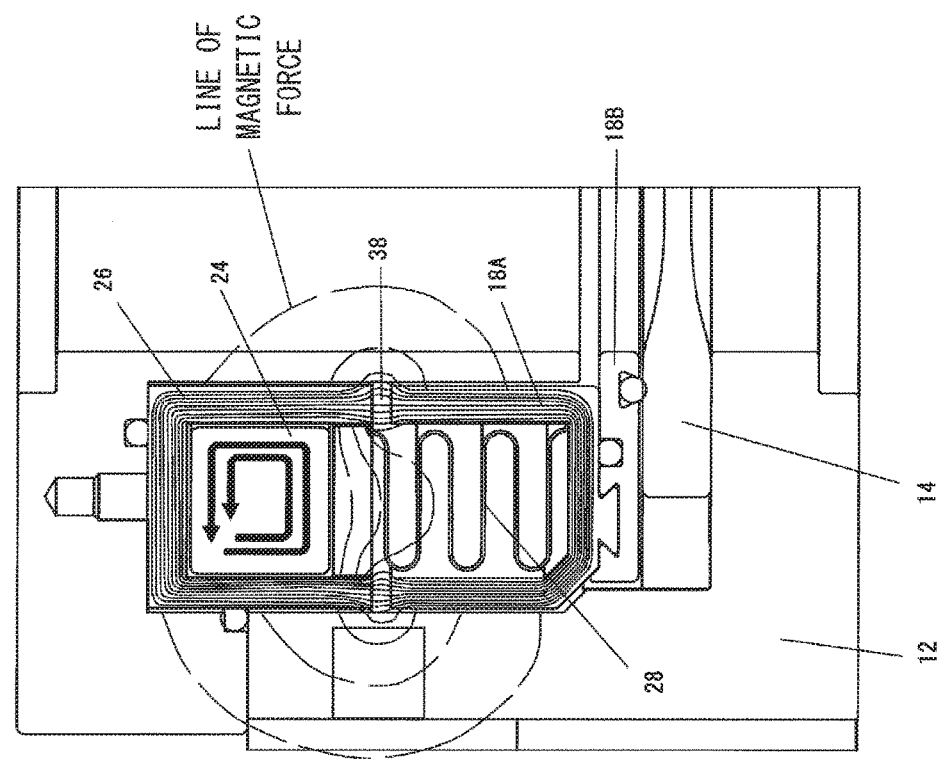
FIGS. 3A and 3B are cross-sectional views illustrating states of a magnetic force generated by an electromagnet for use in the embodiment of the present invention.
Figure 3B:
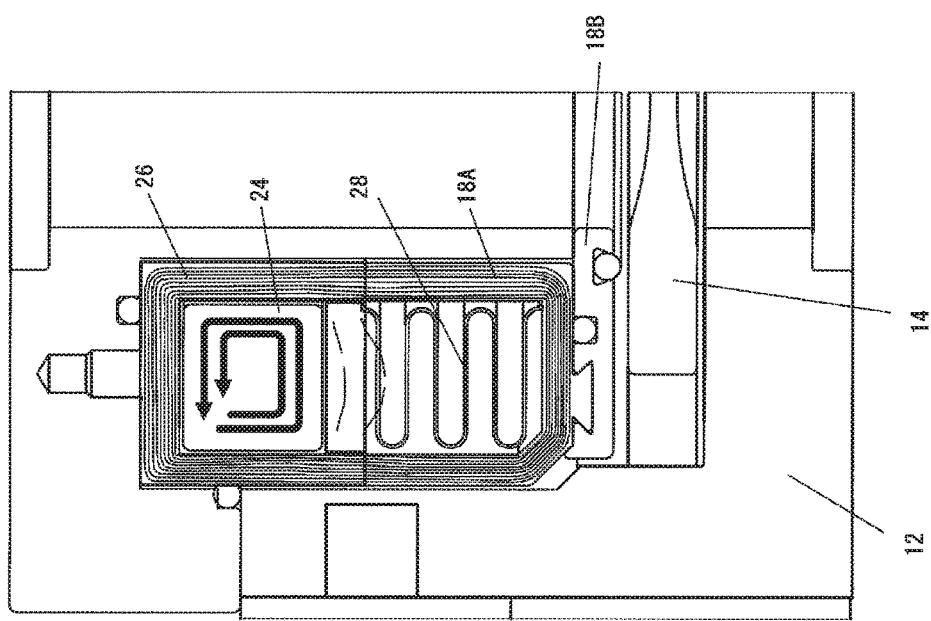

This electromagnet 24 includes a not-illustrated magnetic core and a coil wound around the magnetic core and generates a magnetic force when this coil is connected to a power supply 25 and has electric current flow therein through electric conduction from this power supply 25. Accordingly, this electromagnet 24 generates a magnetic force through electric conduction to magnetize the adsorbing body 26 and the rise/lower element 18, and as illustrated in FIG. 3A, the adsorbing body 26 adsorbs and attracts the rise/lower element 18 to the side of the electromagnet 24 to enable the rise/lower element 18 to be moved up. Conversely, when electric conduction to the electromagnet 24 is stopped, the electromagnet 24 loses a magnetic force, cancels adsorption of the rise/lower element 18 on the adsorbing body 26, and allows the rise/lower element 18 to move down, to enable the rise/lower element 18 to be moved down.

In this case, in a case in which rising/lowering of the rise/lower element 18 is controlled only by on/off operations of current flowing into the coil of the electromagnet 24, only either upward movement or downward movement is selected. However, depending on the rising/lowering speed, an impact at the time of collision of the rise/lower element 18 with the adsorbing body 26 (at the time of upward movement) or at the time of collision of the rise/lower element 18 with the valve plate 14 (at the time of downward movement) will be significant, which may cause generation of particles due to metal contact and damage of the rise/lower element 18, the adsorbing body 26, and the valve plate 14. Thus, it is preferable for the raising/lowering unit 20 to control electric conduction to the electromagnet 24 to adjust a magnetic force generated by the electromagnet 24 and move the rise/lower element 18 up and down.

2.-3 Sensor

Specifically, as illustrated in FIGS. 2A and 2B, the raising/lowering unit 20 also includes a sensor 36 that detects magnetic flux density generated by the electromagnet 24, and by controlling electric conduction to the electromagnet 24 in accordance with the magnetic flux density detected by this sensor 36 and adjusting a magnetic force, rising/lowering speed of the rise/lower element 18 can be controlled. Thus, collision or the like of the rise/lower element 18 with the adsorbing body 26 and the valve plate 14 caused by unnecessary sudden upward or downward movement of the rise/lower element 18 can appropriately be restricted, and generation of particles due to metal contact can be restricted.

In this case, to measure intensity of the magnetic force by means of the sensor 36, it may actually be preferable to install the sensor 36 in a part of the adsorbing body 26, which is being magnetized by the electromagnet 24. However, since the adsorbing body 26 is in a high-temperature state at about 80° C. to 120° C., heat resistance of the sensor 36 needs to be considered. Also, it may be preferable to install the sensor 36 between the adsorbing body 26 and the rise/lower element 18 to measure the magnetic flux density appropriately. However, when the sensor 36 is installed in a part of a gap 38, the sensor 36 may be impacted at the time of collision between the adsorbing body 26 and the rise/lower element 18. Hence, in the embodiment, as illustrated in FIGS. 2A and 2B, the sensor 36 is installed in a position that is not a part of the adsorbing body 26 magnetized by the electromagnet 24 or rise/lower element 18 and that is away from the gap 38 (refer to FIGS. 2A and 2B) between the adsorbing body 26 and the rise/lower element 18. Specifically, in the illustrated embodiment, as illustrated in FIGS. 2A and 2B, the sensor 36 is installed inside a sensor hole 12*b* provided beside the gap 38 between the adsorbing body 26 and the rise/lower element 18 in the casing 12 and detects the magnetic flux density generated by the electromagnet 24 in a position beside the gap 38 between the adsorbing body 26 and the rise/lower element 18.

In this manner, the sensor 36 can detect the magnetic flux density appropriately without being influenced by heat since the sensor 36 is installed in the position that is not a part of the heated adsorbing body 26 or rise/lower element 18 and without being impacted at the time of collision between the adsorbing body 26 and the rise/lower element 18 since the sensor 36 is installed in the position that is away from the gap 38. Also, since the sensor 36 is installed beside the gap 38 between the adsorbing body 26 and the rise/lower element 18, which is located on the atmospheric side at all times, the sensor 36 can detect the magnetic flux density appropriately and can control rising/lowering speed of the rise/lower element 18 accurately without being influenced by vacuum.

Figure 4:
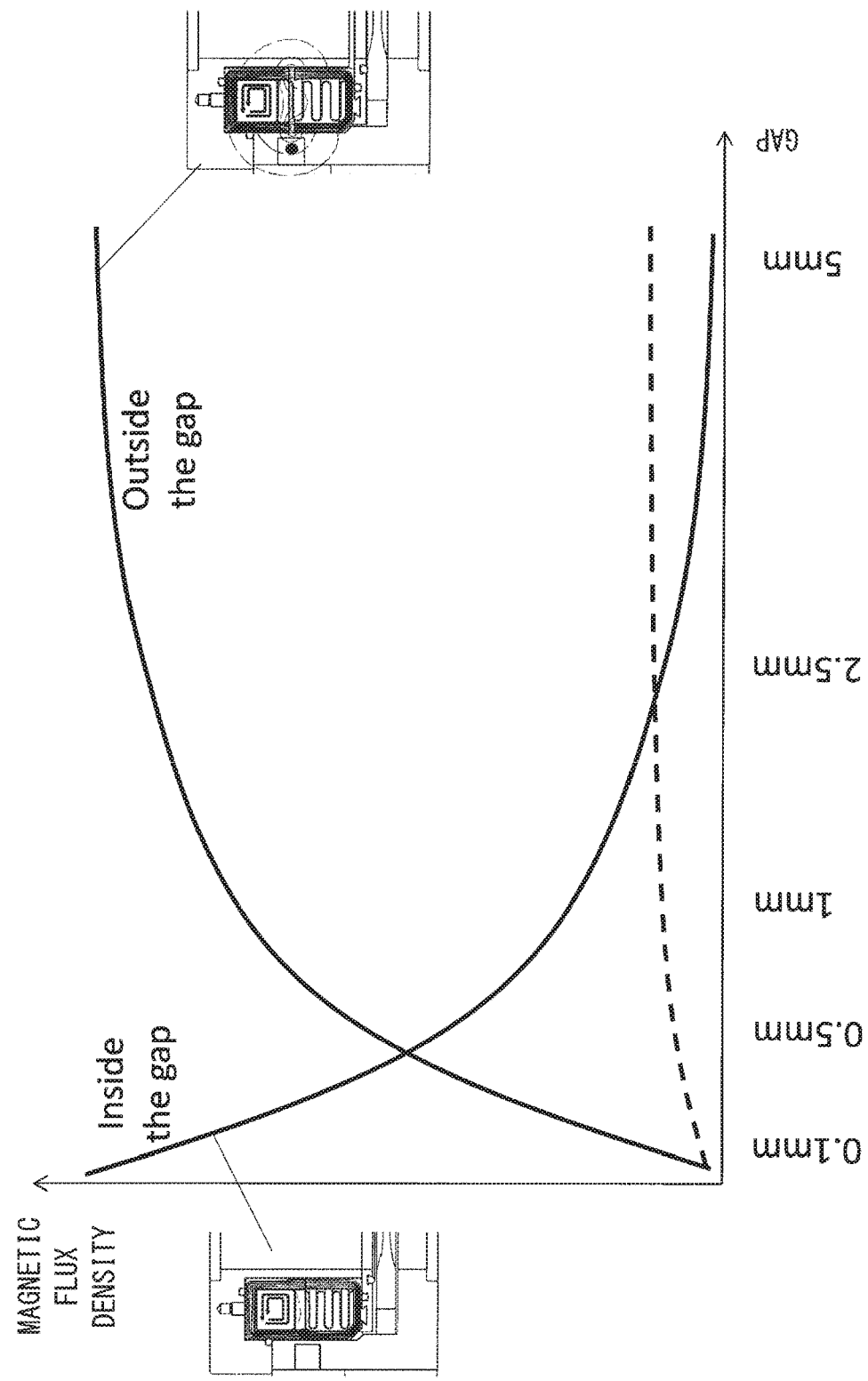
FIG. 4 is a graph illustrating a distribution state of magnetic flux density generated by the electromagnet for use in the embodiment of the present invention.

In this case, in a case in which the magnitude of current flowing in the electromagnet 24 is constant, and in which intensity of the magnetic force itself is equal, the magnetic flux density in the gap 38 (between the adsorbing body 26 and the rise/lower element 18) is higher, and the magnetic force is stronger, as the gap 38 is smaller, and the magnetic flux density in the gap 38 is lower, and the magnetic force is weaker, as the gap 38 is larger, as illustrated in FIG. 4. Accordingly, in a case in which the sensor 36 is installed in the gap 38, a part of the adsorbing body 26, or the like, the detected magnetic flux density directly reflects intensity of the current magnetic force. That is, it is possible to determine that the magnetic force is strong when the magnetic flux density is high and weak when the magnetic flux density is low.

However, in a case in which the sensor 36 is installed in a position that is away from the gap 38 or the magnetized adsorbing body 26 or the like as in the embodiment, the measured magnetic flux density cannot directly be regarded as intensity of the magnetic force. The reason for this is that, as illustrated in FIG. 4, the magnetic flux density in the position away from the gap 38 (position away in the horizontal direction from the gap 38) is inversely proportional to the magnetic flux density in the gap 38 (between the adsorbing body 26 and the rise/lower element 18). The magnetic flux density is higher (the magnetic force is weaker) as the gap 38 is larger, and the magnetic flux density is lower (the magnetic force is stronger) as the gap 38 is smaller. In this case, when the gap 38 is "0," that is, when the rise/lower element 18 closely contacts the adsorbing body 26, the intensity of the magnetic force is the maximum, and a value of the magnetic flux density detected by the sensor 36 installed beside the gap 38 is "0."

Thus, in the embodiment, the magnetic force of the electromagnet 24 is determined to be stronger as the magnetic flux density detected by the sensor 36 is lower, the magnetic force of the electromagnet 24 is determined to be weaker as the magnetic flux density detected by the sensor 36 is higher, and the downward movement speed of the rise/lower element 18 is set to a predetermined value in accordance with this magnetic force. Specifically, to adjust the rising/lowering speed to a preset target value after measurement by means of the sensor 36, when one wishes to decrease the upward movement speed or increase the downward movement speed due to a too strong magnetic force, the rising/lowering speed can be adjusted by making current flowing in the coil of the electromagnet 24 smaller to weaken the magnetic force, and conversely, when one wishes to increase the upward movement speed or decrease the downward movement speed due to a too weak magnetic force, the rising/lowering speed can be adjusted by making current flowing in the coil of the electromagnet 24 larger to strengthen the magnetic force. Accordingly, collision or the like of the rise/lower element 18 with the adsorbing body 26 and the valve plate 14 caused by unnecessary sudden upward or downward movement of the rise/lower element 18 can appropriately be restricted, and generation of particles due to metal contact can be restricted.

As illustrated in FIGS. 1, 2A, and 2B, since this sensor 36 is arranged inside the sensor hole 12*b* that communicates into an outside of the casing 12, the sensor 36 can be attached/detached from the outside of the casing 12. Thus, even in a case in which maintenance, such as an inspection and cleaning, and replacement, of the sensor 36 are required, one can easily access the sensor 36 and can easily perform the operations.

2.-4 Bellows

In addition, the bellows 28 of the raising/lowering unit 20 function to guide rising/lowering of the rise/lower element 18 when the rise/lower element 18 rises/lowers. That is, in a case in which the bellows 28 are not provided, the rise/lower element 18 is arranged in a free state inside the casing 12, and the rise/lower element 18 is moved up and down only by adsorption by means of the electromagnet 24 and cancel thereof, the rise/lower element 18 moves up and down in a state of being inclined or distorted inside the casing 12, which may cause metal contact between the rise/lower element 18 and the casing 12. Thus, by regulating the position of the rise/lower element 18 with use of the bellows 28, the rise/lower element 18 can be moved up and down in an appropriate orbit even when the rise/lower element 18 is moved up and down by the electromagnet 24 without contacting the casing 12.

In this case, as illustrated in FIGS. 1, 2A, and 2B, since the bellows 28 themselves are installed inside the recess of the rise/lower element 18, the bellows 28 can guide the rise/lower element 18 without contacting the casing 12, that is, with a space 23 left between the rise/lower element 18 and the casing 12. At the same time, unlike an O-ring, which is conventionally used, the bellows 28 themselves will not contact the casing 12, and no particles due to metal contact will thus be generated.

The bellows 28 are specifically a bellows-like spring and have spring characteristics (elasticity). In this case, in a normal state (in a natural state), the spring-like bellows 28 bias the rise/lower element 18 in a direction of pressing the rise/lower element 18 against the valve plate 14, and the electromagnet 24 moves up the rise/lower element 18 against the pressing force of the bellows 28. Conversely, along with cancel or reduction of electric conduction to the electromagnet 24, the rise/lower element 18 can be moved down in the direction of pressing the rise/lower element 18 against the valve plate 14 due to a restoring force of the bellows 28. Thus, the bellows 28 can absorb an impact generated at the time of contact of the rise/lower element 18 with the adsorbing body 26 or the valve plate 14 and restrict generation of particles due to metal contact. While, as illustrated in FIG. 2B, elasticity of the bellows 28 allows the rise/lower element 18 to closely contact the valve plate 14 to press down the valve plate 14 and allows the valve plate 14 to closely contact the casing 12 to enable a sealed state to be kept, as illustrated in FIG. 2A, contraction of the bellows 28 against the magnetic force of the electromagnet 24 allows the rise/lower element 18 to be separated from the valve plate 14 and allows the valve plate 14 to be released from the casing 12 to enable swing of the valve plate 14 to be allowed. In this case, while an inter-pleat distance of the bellows-like bellows 28 is approximately 25 mm in an entirely closed state illustrated in FIG. 2B, the inter-pleat distance is reduced to approximately 23 mm in an entirely opened state illustrated in FIG. 2A. It is to be noted that the inter-pleat distance depends on the number of pleats.

Also, as illustrated in FIGS. 2A and 2B, the first end (upper end) of the bellows 28 is connected to the side of the casing 12 (specifically, the adsorbing body 26) while the second end (lower end) thereof is connected to the rise/lower element 18 (specifically, a bottom surface of the recess of the recessed rise/lower element 18) to connect the rise/lower element 18 to the adsorbing body 26. Thus, especially as illustrated in FIG. 5B, even in the entirely closed state, in which the valve plate 14 closely contacts the casing 12, the bellows 28 can block flowing of atmospheric air into the rear side of the valve plate 14 (the processing chamber side, which is an opposite side of the rise/lower element 18 with the valve plate 14 interposed therebetween) via the gap 38 between the rise/lower element 18 and the adsorbing body 26. While the rise/lower element 18 is in a non-contact state with the casing 12 without using the O-ring or the like, that is, while a space 23 exists between the rise/lower element 18 and the casing 12, the sealed state on the processing chamber side can be secured.

Further, the bellows 28 are made of a non-magnetic material such as stainless steel. Specifically, the bellows 28 can be made of SUS304. Thus, the bellows 28 can expand and contract together with upward and downward movement of the rise/lower element 18 independently from the magnetic force generated by the electromagnet 24 and can appropriately exert guiding of the rise/lower element 18 and a buffer effect.

3. Valve Plate

As illustrated in FIG. 2A, the valve plate 14 is adapted to leave a gap between the valve plate 14 and the casing 12 when the valve plate 14 is released from the close-contact state with the casing 12 by the position adjuster 16. Specifically, an approximately-1-mm gap is set between the valve plate 14 and the casing 12. This can prevent the valve plate 14 from contacting the casing 12 or the like at the time of swing and being consequently damaged and can secure smooth swing. That is, the position adjuster 16 is adapted to bring the valve plate 14 into close contact with the casing 12 against position setting of the valve plate 14 in a free state as illustrated in FIG. 2B.

Figure 6:
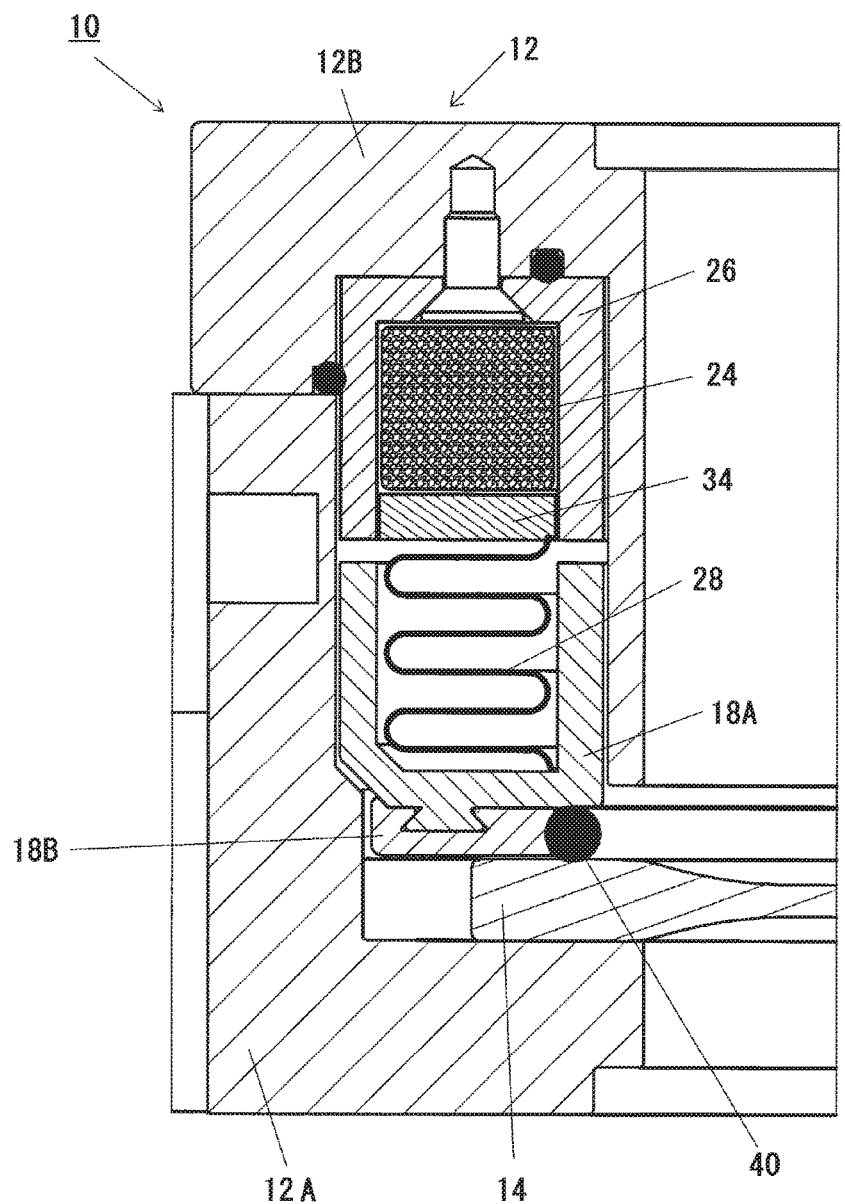
FIG. 6 is a cross-sectional view of another mode of the vacuum gate valve according to the embodiment of the present invention.

Meanwhile, in the embodiment illustrated in FIGS. 2A and 2B, the pressing member 18B of the rise/lower element 18 is provided on an upper surface thereof with the main-body-side O-ring 22A and is provided on a lower surface thereof with the plate-side O-ring 22B to be elastically engaged with the rise/lower element main body 18A and the valve plate 14. However, as illustrated in FIG. 6, one bonded O-ring 40 attached to an inner circumferential surface of the pressing member 18B, enabling simultaneous elastic engagement with both the rise/lower element main body 18A and the valve plate 14, and having a relatively large diameter can be used.

Also, the valve plate 14 may be provided with a not-illustrated ring-like cushion material that elastically contacts the casing 12 at the time of close contact with the casing 12. Thus, even when the valve plate 14 is pressed by the casing 12 or slides due to the close contact, direct metal contact can be avoided, and generation of particles at the time of the close contact can thus be restricted effectively. Also, even in a case in which the valve plate 14 collides with the casing 12 due to an unexpected error at the time of swing or the like of the valve plate 14, generation of particles and damage of the valve plate 14 and the casing 12 can be restricted effectively.

The present invention can widely be applied especially to a processing chamber and the like for use in thin-film processing by means of an etching unit and CVD in a semiconductor device, PVD, in manufacture of a flat panel display, and the like.

It should be understood that the invention is not limited to the above-described embodiment, but may be modified into various forms on the basis of the spirit of the invention. Additionally, the modifications are included in the scope of the invention.

What is claimed is:

1. A vacuum gate valve including a casing having an opening, and a valve plate that swings in the casing to open/close the opening, the vacuum gate valve comprising:
   a position adjusting assembly arranged circumferentially about the opening and housed inside the casing at a circumferential gap therefrom, the position adjusting assembly for bringing the valve plate into close contact with the casing when the valve plate is in a position where it entirely closes the casing opening; wherein the position adjusting assembly includes a rise/lower armature arranged circumferentially about the opening and movable upward and downward inside the casing along an O-ring-free, grease-free portion of the circumferential gap, the rise/lower armature for coming into close contact with the valve plate in electromagnetically actuated downward movement and separating from the valve plate in electromagnetically actuated upward movement, and an electromagnetic raising/lowering actuator arranged circumferentially about the opening, and fixed to and sealed airtight against the casing, the raising/lowering actuator for electromagnetically raising/lowering the rise/lower armature inside the casing without friction resistance being generated between the rise/lower armature and the casing.

2. The vacuum gate valve according to claim 1, wherein the electromagnetic raising/lowering actuator raises/lowers the rise/lower armature without the rise/lower armature contacting the casing.

3. The vacuum gate valve according to claim 1, wherein the electromagnetic raising/lowering actuator includes an electromagnet that generates magnetic force through electric current to attract the rise/lower armature, and a power supply that controls the electric current to adjust the magnetic force generated by the electromagnet in order to raise/lower the rise/lower armature.

4. The vacuum gate valve according to claim 3, wherein the electromagnetic raising/lowering actuator includes a sensor that detects magnetic flux density generated by the electromagnet, and by controlling electric current to the electromagnet in accordance with the magnetic flux density detected by the sensor and adjusting the magnetic force, controls rising/lowering speed of the rise/lower armature.

5. The vacuum gate valve according to claim 4, wherein the electromagnet is installed interiorly in an adsorbing body that is installed inside the casing where, being magnetized by the electromagnet, the adsorbing body adsorbs the rise/lower armature, and the sensor is installed in a position that is apart from the adsorbing body magnetized by the electromagnet and from the rise/lower armature, as well as apart from a gap between the adsorbing body and the rise/lower armature, and detects the magnetic flux density generated by the electromagnet.

6. The vacuum gate valve according to claim 5, wherein the sensor is installed beside the gap between the adsorbing body and the rise/lower armature.

7. The vacuum gate valve according to claim 5, wherein the electromagnetic raising/lowering actuator has control functionality to determine that the magnetic force of the electromagnet is stronger as the magnetic flux density detected by the sensor is lower, determine that the magnetic force of the electromagnet is weaker as the magnetic flux density detected by the sensor is higher, and to set, via the power supply, rising/lowering speed of the rise/lower armature to a predetermined value in accordance with the magnetic force.

8. The vacuum gate valve according to claim 4, wherein the sensor is installed inside the casing and can be attached/detached from the casing's outer side.

9. A vacuum gate valve including a casing having an opening, and a valve plate that swings in the casing to open/close the opening, the vacuum gate valve comprising:

a position adjusting assembly arranged circumferentially about the opening and housed inside the casing, the position adjusting assembly for bringing the valve plate into close contact with the casing when the valve plate is in a position where it entirely closes the casing opening; wherein the position adjusting assembly includes a rise/lower armature arranged circumferentially about the opening and movable upward and downward inside the casing, the rise/lower armature for coming into close contact with the valve plate in electromagnetically actuated downward movement and separating from the valve plate in electromagnetically actuated upward movement, and an electromagnetic raising/lowering actuator arranged circumferentially about the opening, the raising/lowering actuator for raising/lowering the rise/lower armature inside the casing without friction resistance being generated between the rise/lower armature and the casing, wherein the raising/lowering actuator includes bellows that are in a non-contact state with the casing, and the bellows guide rising/lowering of the rise/lower armature in the rise/lower armature's rising/lowering.

10. The vacuum gate valve according to claim 9, wherein the bellows have spring characteristics and bias the rise/lower armature in a direction of pressing the rise/lower armature against the valve plate in a normal state, and the electromagnet elevates the rise/lower armature against the pressing force of the bellows.

11. The vacuum gate valve according to claim 9, wherein a first end of the bellows is connected to a side of the casing while a second end of the bellows is connected to the rise/lower armature to block flowing of atmospheric air into a rear side of the valve plate.

12. The vacuum gate valve according to claim 9, wherein the bellows are made of a non-magnetic material.

* * * * *